US012330285B2

(12) United States Patent
Hoelscher et al.

(10) Patent No.: US 12,330,285 B2
(45) Date of Patent: Jun. 17, 2025

(54) METHOD FOR INDICATING WHETHER A HAND-HELD POWER TOOL HAS REACHED A TARGET (71) Applicant: Robert Bosch GmbH, Stuttgart (DE)

(72) Inventors: Florian Hoelscher, Stuttgart (DE); Heiko Roehm, Stuttgart (DE); Simon Erbele, Nufringen (DE); Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/492,907

(22) Filed: Oct. 24, 2023

(65) Prior Publication Data
US 2024/0139931 A1 May 2, 2024

(30) Foreign Application Priority Data

Nov. 2, 2022 (DE) ...................... 10 2022 211 593.7

(51) Int. Cl.
*B25F 5/02* (2006.01)
*H02P 3/02* (2006.01)

(52) U.S. Cl.
CPC . *B25F 5/02* (2013.01); *H02P 3/02* (2013.01)

(58) Field of Classification Search
CPC ................ B25F 5/00; B25F 5/02; H02P 3/02
See application file for complete search history.

(56) References Cited

U.S. PATENT DOCUMENTS

| | | | | |
|---|---|---|---|---|
| 2011/0245833 A1* | 10/2011 | Anderson | .......... | A61B 17/1628 606/80 |
| 2011/0303427 A1* | 12/2011 | Tang | .......... | H02P 3/08 173/176 |
| 2012/0199372 A1* | 8/2012 | Nishikawa | .......... | B25B 21/02 173/132 |
| 2014/0284070 A1* | 9/2014 | Ng | .......... | B25F 5/00 173/2 |
| 2018/0065232 A1* | 3/2018 | Mueckl | .......... | B25B 21/00 |
| 2020/0338679 A1* | 10/2020 | Marquette | .......... | G06Q 10/06 |
| 2020/0398416 A1* | 12/2020 | Matei | .......... | G01S 7/4813 |
| 2021/0205976 A1* | 7/2021 | Matei | .......... | G08B 7/06 |
| 2021/0240145 A1* | 8/2021 | Abbott | .......... | B25F 5/001 |
| 2023/0073490 A1* | 3/2023 | Dieter | .......... | B25F 5/024 |

FOREIGN PATENT DOCUMENTS

| | | |
|---|---|---|
| CN | 206855337 U | 1/2018 |
| DE | 10 2013 203 397 A1 | 1/2014 |
| DE | 10 2012 219 177 A1 | 4/2014 |
| DE | 10 2018 218 685 A1 | 4/2020 |

(Continued)

OTHER PUBLICATIONS

Translation of WO 2023246460 A1 (Year: 2023).*

*Primary Examiner* — Thomas M Wittenschlaeger
(74) *Attorney, Agent, or Firm* — Maginot, Moore & Beck LLP (57) ABSTRACT

A method for indicating whether a hand-held power tool has reached a target is disclosed. The hand-held power tool includes a drive motor and the method includes (i) activating a target reached indication mode by way of a control unit, (ii) ascertaining a shutdown reason for the drive motor, and (iii) displaying the reaching of the target by way of a display unit as a function of the shutdown reason.

10 Claims, 3 Drawing Sheets

(56) References Cited

FOREIGN PATENT DOCUMENTS

| | | |
|---|---|---|
| DE | 10 2019 216 038 A1 | 4/2021 |
| DE | 10 2021 208 653 A1 | 2/2023 |
| WO | 2017/162600 A1 | 9/2017 |
| WO | 2021/016437 A1 | 1/2021 |
| WO | WO-2023246460 A1 * | 12/2023 |

* cited by examiner

METHOD FOR INDICATING WHETHER A HAND-HELD POWER TOOL HAS REACHED A TARGET

This application claims priority under 35 U.S.C. § 119 to patent application no. DE 10 2022 211 593.7, filed on Nov. 2, 2022 in Germany, the disclosure of which is incorporated herein by reference in its entirety.

The present disclosure relates to a method for indicating whether a hand-held power tool has reached a target.

BACKGROUND

A hand-held power tool with a display for displaying a state of the hand-held power tool is known from CN206855337U.

SUMMARY

The present disclosure describes a method for indicating whether a hand-held power tool has reached a target, wherein the hand-held power tool comprises a drive motor and the method comprises the steps
- activating a target reached indication mode by means of a control unit;
- ascertaining a shutdown reason for the drive motor;
- displaying the reaching of the target by means of a display unit as a function of the shutdown reason.

The disclosure provides a method by means of which the shutdown reason can be displayed to a user. This enables the user to immediately see whether a goal has been achieved, for example whether a screwing operation has been completed. The method also enables the user to immediately see whether an operating mode has been carried out completely or incompletely. The indication that the hand-held power tool has reached the target by means of the display unit notifies the user of this. This increases user-friendliness, because the user can verify that the hand-held power tool is functioning correctly.

The hand-held power tool can be configured as an electrically or pneumatically operated hand-held power tool. The electrically operated hand-held power tool can be configured as a mains-operated or a cordless hand-held power tool. The hand-held power tool can be configured as a screwdriver, a pneumatic screwdriver, a drill driver, a rotary impact screwdriver, a hammer, a hammer drill, a pneumatic rotary impact screwdriver, or an impact drill driver, for example.

The housing can be configured as a shell housing, for instance comprising two half shells. The housing accommodates at least one drive unit. The drive unit includes the drive motor and a transmission. The drive motor can be configured as an electrically commutated drive motor, in particular as at least one electric motor. The drive motor is configured such that it can be actuated via a manual switch. When the manual switch is actuated by a user, the drive motor is switched on and the hand-held power tool is put into operation. If the manual switch is not further actuated by the user, the drive motor is switched off. The drive motor can preferably be electronically controlled and/or regulated in such a way that a reversing mode and a specification for a desired rotational speed can be implemented. In reversing mode, the drive motor can be switched between a clockwise direction of rotation and a counterclockwise direction of rotation. To switch the drive motor in reversing mode, the hand-held power tool can comprise a rotation direction switching element, in particular a rotation direction changeover switch.

The drive motor is configured to drive a tool holder via the transmission. The transmission can be configured as at least one planetary gear, in which case it can, for example, be shiftable. The planetary gear can comprise at least one planetary gear stage.

The hand-held power tool can comprise a percussion mechanism which is configured to be operated in a percussive operating mode. In the percussive operating mode, the percussion mechanism generates high torque peaks to loosen stuck connecting means or tighten connecting means. The percussion mechanism can be connected to the tool holder. The percussion mechanism can be configured as a percussion-rotation mechanism, a rotary percussion mechanism, or a V-groove percussion mechanism, for example.

The tool holder can be configured as an internal tool holder, for example a bit holder, and/or as an external tool holder, for example a socket holder. It is also conceivable that the tool holder is configured as a drill chuck. The tool holder can accommodate insert tools, such as screwdriver bits or sockets, so that a user can make screw connections between a fastener and a fastener holder.

The hand-held power tool further includes a power supply, wherein the power supply is provided for cordless operation by means of rechargeable batteries, in particular hand-held power tool rechargeable battery packs, and/or for mains operation. In a preferred embodiment, the power supply is configured for cordless operation. In the context of the present disclosure, a "hand-held power tool rechargeable battery pack" is intended to be understood as a combination of at least one rechargeable battery cell and a rechargeable battery pack housing. The hand-held power tool rechargeable battery pack is advantageously configured for supplying power to commonly available cordless hand-held power tools. The at least one rechargeable battery cell can, for instance, be configured as a Li-ion rechargeable battery cell having a nominal voltage of 3.6 V. The hand-held power tool rechargeable battery pack can include up to ten rechargeable battery cells, for example, although a different number of rechargeable battery cells is conceivable too. Both an embodiment as a cordless hand-held power tool and operation as a mains-operated hand-held power tool are sufficiently well-known to those skilled in the art, so the specifics of the power supply will not be discussed here.

In one embodiment, the housing comprises at least one power supply holding device, in particular a hand-held power tool rechargeable battery pack holding device, of the power supply, on which a user interface is disposed. The power supply holding device is in particular configured to hold, in particular accommodate, the power supply, in particular the hand-held power tool rechargeable battery pack. The power supply holding device is further provided to releasably connect the power supply, in particular the hand-held power tool rechargeable battery pack, to the housing without the need for tools and to ensure the power supply to the hand-held power tool. Together with a connected hand-held power tool rechargeable battery pack, the power supply holding device forms at least one base comprising at least one standing surface. The hand-held power tool can in particular be stored, in particular placed, on a standing surface by means of the base. The housing also includes a handle. The handle is configured to be grasped by the user in order to use the hand-held power tool. The power supply holding device is in particular disposed on the handle.

The target reached indication mode is activated by means of the control unit. The control unit is at least configured to control the drive motor. The control unit can also be disposed in the housing, for example in a handle of the hand-held power tool or in a region of a power supply interface. The control unit can comprise at least one microprocessor or a microcontroller. The target reached indication mode can be configured such that it can be activated in addition to an existing or adjustable operating mode of the hand-held power tool, in particular of the drive motor. It is furthermore conceivable that the target reached indication mode can be permanently set to an activatable operating mode. The target reached indication mode can be activated via a user interface of the hand-held power tool or via an app of an external electrical device. The user interface is disposed on the housing. The user interface can be an interface between the user and the hand-held power tool. The user interface comprises at least one control element which is configured to receive inputs from the user. The control element advantageously serves at least to set or activate the operating mode, the target reached indication mode, at least one status of the hand-held power tool, and/or a function of the hand-held power tool. It is conceivable that the control element can also be configured to be assigned to set an operating mode that can be allocated by the user. When the user actuates the control element, the user interface forwards the user's input to the control unit. The control unit then controls the drive motor, for instance. It is conceivable that the hand-held power tool, in particular the control unit, comprises a memory unit on which the target reached indication mode is stored. It is also conceivable that the target reached indication mode is stored on the control unit.

As soon as the drive motor switches off or stops, the shutdown reason for the drive motor is ascertained. A reason for a shutdown of the drive motor can be acquired. The reason for the shutdown is a drive motor speed stop, a power supply stop, or an overheating stop, for example. The reason for the shutdown can also be a protective shutdown that protects the hand-held power tool and/or the user from thermal and/or mechanical overloads or from an empty rechargeable battery, in particular an empty hand-held power tool rechargeable battery pack. The reason for the shutdown can moreover be a not actuated manual switch. The reason for the shutdown can also be a motor stop triggered by an operating mode. The shutdown reason is ascertained when the drive motor switches off.

The reaching of the target is displayed by means of a display unit as a function of the shutdown reason. The user interface comprises the display unit for indicating the status of the hand-held power tool. The control unit controls the display unit as a function of the shutdown reason. The user interface and the control unit are electrically connected to one another. It is conceivable that the display unit of an external electrical device, for example a smartphone, is used.

The display unit is configured to display the status of the hand-held power tool. The display unit can be lit continuously in one color, for instance, or flash in one color. For example, it is possible for the display unit to be lit in a green, red, blue, or yellow color. The status can be "hand-held power tool switched on", for instance, or "hand-held power tool switched off". When the hand-held power tool is switched on, the display unit can be lit in a green color, for example. When the hand-held power tool rechargeable battery pack is half full, the display unit can be lit in yellow, for example. When the drive unit is overheated or the hand-held power tool rechargeable battery pack is dead, for example, the display unit can be lit in red. When the hand-held power tool is connected by means of an external electrical device, such as a smartphone, the display unit can be lit in blue, for example.

In one embodiment of the method, an operating mode of the hand-held power tool, in particular the drive motor, is activated in a method step. The operating mode includes a functionality of how the hand-held power tool should function during operation. The operating mode can, for example, be a screwing mode, a drilling mode, a rotary impact mode, a hard/soft screw application mode, a wood screwing mode, a metal screwing mode, a loosening mode, in particular a screw loosening mode, a speed level, a kickback mode, or a precision clutch mode. The operating mode can be set or selected using the user interface, for instance. It is also conceivable that the operating mode can be activated on the external electrical device by means of an app. As soon as the operating mode is activated, a control command is sent to the control unit for activation. The target reached indication mode is configured to check the operating mode. The target reached indication mode checks whether the operating mode has reached a stored target or the drive motor has switched off prematurely.

In one embodiment of the method, reaching a target value is ascertained as the shutdown reason, in particular of the drive motor. The target value is stored in the operating mode. After the operating mode has been set, the target value can be set. The target value can be permanently stored in the operating mode or can be set by the user. The target value can also be adjustable or preset. With the adjustable target value, the user can switch off the drive motor prematurely, i.e., earlier than stored. The target value can, for instance, be a number of drive motor revolutions, a current profile of the drive motor, a drive motor temperature, a movement pattern of the drive motor, an operating time of the drive motor or the like. Reaching the target value is intended to be understood such that the operating mode has substantially been completed and the drive motor switches off independently once the target value has been reached, in particular substantially without any further involvement of the user.

In one embodiment of the method, a deviation of a target value is ascertained as the shutdown reason. The deviation of the target value can be the result of an incomplete or prematurely ended operating mode, for example. Examples of this would be the user releasing the manual switch prematurely, the user not pushing the manual switch all the way down, a battery voltage of the rechargeable battery, in particular of the hand-held power tool rechargeable battery pack, dropping below a critical battery voltage value, a battery load of the rechargeable battery, in particular of the hand-held power tool rechargeable battery pack, exceeding a critical battery voltage value, a drive motor temperature exceeding a critical drive motor temperature value, a battery temperature of the rechargeable battery, in particular of the hand-held power tool rechargeable battery pack, exceeding a critical battery temperature value, an acceleration, in particular an acceleration of the housing, of the hand-held power tool exceeding a critical acceleration value, a protection algorithm has reached a target value or the like. The deviation of the target value can be a deviation of a target value of the drive motor or a deviation of a target value of a sensor unit of the hand-held power tool. The target value can thus include a sensor value of the sensor unit, so that the shutdown reason can be a deviation of the sensor value from the target value.

In one embodiment of the method, a position of a manual switch for controlling the drive motor, in particular by means of the control unit, is acquired in a method step. As described above, the manual switch for controlling the drive motor is disposed on the handle of the hand-held power tool. The position, in particular an actuation path, of the manual switch can be acquired by the control unit. The position of the manual switch can serve as a criterion for the shutdown reason. For example, if the manual switch is pushed all the way down when the drive motor switches off, it can be assumed that there is a high probability that the operating mode has been completed. If the manual switch is not pushed all the way down when the drive motor switches off, it can be assumed that there is a high probability that the operating mode has not been completed. The control unit therefore ascertains the position, in particular the actuation path, of the manual switch in order to draw conclusions regarding the completeness of the operating mode.

In one embodiment of the method, a parameter correlated with the drive motor is acquired, in particular by means of at least one sensor unit, to ascertain the shutdown reason. The parameter correlated with the drive motor can, for instance, be a drive motor speed, a number of drive motor revolutions, a number of Hall edges of the drive motor, a drive motor current, a drive motor voltage, a drive motor temperature, an operating time of the drive motor, a drive motor acceleration or the like. The sensor unit can be disposed in or on the housing of the hand-held power tool. The sensor unit can, for instance, be a rotation rate sensor, an acceleration sensor, a Hall sensor, a time measurement sensor, a kickback sensor or the like. The parameter correlated with the drive motor is processed by means of the control unit. The sensor unit can forward the parameter to the control unit. The parameter can also be used to evaluate the reaching of the target.

In one embodiment of the method, an evaluation of an event register is carried out to ascertain the shutdown reason. The event register can be stored in the control unit. The event register can also be stored on an external electrical device, for example a smartphone, a server, or a backend. The event register can be configured as external software, for example. The event register can acquire the target value, for example by means of a communications unit, and evaluate it accordingly. The hand-held power tool and/or the external electrical device can each comprise a communications unit. It is possible that the control unit and/or the external electrical device evaluates a combination of the parameter correlated with the drive motor and the event register. It is furthermore possible that the control unit reads the event register, since the shutdown reason was stored in the event register when the drive motor was switched off. It is possible that the control unit enters an input into the event register when the drive motor is switched off by the user. It is possible that an evaluation of the manual switch and the event register is stored as the shutdown reason in one of the operating modes. It is therefore possible that the event register and/or a position of the manual switch is evaluated when checking the target value to decide whether the target value has been reached.

In one embodiment of the method, reaching the target is displayed, in particular by means of the display unit, during an adjustable display duration. The display duration can be set by means of the user interface and/or the app. It is also possible that the display duration is permanently stored in the control unit. The display duration can be set to a range from 1 s to 30 s, for example, in particular from 5 s to 20 s. After the display duration has elapsed, the display unit is switched off.

In one embodiment, a match signal is displayed by means of the display unit when reaching the target is ascertained. The match signal can be a green-lit display unit, in particular LED, for instance. The match signal can also be output as an acoustic and/or haptic signal. The match signal here can be a substantially complete reaching of the target value. The match signal can also be a substantially completed operating mode. The target value can have been reached in a range from 90% to 100%, for example.

In one embodiment of the method, a deviation signal is displayed by means of the display unit when a deviation from reaching the target is ascertained. The display unit, in particular at least one LED, can be lit yellow or red, for example, as the deviation signal. It is furthermore possible that the deviation signal is output as an acoustic and/or haptic signal. The deviation signal can be output as a movement of the tool holder, in particular the drill chuck, for instance. It is also possible that the deviation signal is output as a torsional vibration operation of the drive motor, for example with torsional vibrations in an audible frequency range in a range from 20 Hz to 20 000 Hz, in particular in a range from 200 Hz to 10 000 Hz, with an amplitude less than 60°, in particular less than 30°, very particularly less than 10°, and/or with stroke movements of the tool holder less than 2 mm. The deviation signal can include information that the user has prematurely switched off the hand-held power tool or has actuated the manual switch incompletely during the implementation of the operating mode. The deviation signal includes the deviation of the set operating mode from the actually implemented operating mode. The deviation signal is displayed when the deviation is in the range from 1% to 10% from the target value. The deviation signal is displayed here in a manner that is clearly distinguishable from the match signal, so that the user can immediately and directly recognize whether the set operating mode has been carried out properly or improperly.

In one embodiment, the display unit is controlled to a continuous or interval display of reaching the target, in particular by means of the control unit. The continuous or interval display can take place during a defined or definable period of time, for example. The interval display can, for instance, be a flashing or a dimming. The match signal and the deviation signal can both be output as the continuous or interval display.

In one embodiment, the target reached indication mode is activated by means of a communications unit of the hand-held power tool. In the context of the present disclosure, the communications unit is configured to establish a communication link with at least the external electrical device and to transmit and/or receive communication signals. The communication signals can be transmitted by wire, via a wire connection, or via conductor tracks on a printed circuit board, and/or the communication signals can be transmitted wirelessly. Wireless transmission of the communication signals can be in the form of Bluetooth, WLAN, infrared, near field communication (NFC) using RFID technology, as well as other wireless transmission of the communication signals familiar to the person skilled in the art. The communication protocols used can be Bluetooth Smart, GSM, UMTS, LTE, ANT, ZigBee, LoRa, SigFox, NB-IoT, BLE, IrDA, as well as other communication protocols familiar to the person skilled in the art. The communication link can therefore be wireless or wired. The communications unit of the hand-held power tool is electrically connected to the control unit.

The deviation signal and the match signal can both be sent to an external electrical device via the communications unit and displayed there as the deviation signal or the match signal. The deviation signal and/or the match signal can furthermore be stored on the external electrical device, in particular in a memory unit of the external electrical device.

It is also conceivable that the deviation signal and/or the match signal can be forwarded to a backend in order to store them there.

When using the hand-held power tool, the user has different options for control programs with which said user can operate the hand-held power tool. The user can use the hand-held power tool without the set operating mode and without the target reached indication mode. In this case, the user can use, in particular utilize, the hand-held power tool in the usual manner, for instance without assistance from a control program. The user also has the option to set the operating mode via the user interface and/or the app, so that the hand-held power tool is operated according to the operating mode specifications. The user can then use the hand-held power tool with the set operating mode. The user can additionally or alternatively activate the target reached indication mode, so that, after using the hand-held power tool, the user is shown whether they have reached their desired target. It is therefore possible that the user activates the target reached indication mode via the user interface and/or the app and uses the hand-held power tool. It is also possible that the user first sets the operating mode and then activates the target reached indication mode. The user can thus consciously decide by means of which combination of operating modes and target reached indication mode they would like to use the hand-held power tool.

The disclosure is also based on an above-described control unit, comprising means for carrying out the method according to the above-described steps.

The disclosure is furthermore based on an above-described hand-held power tool comprising an above-described control unit for carrying out the method according to the above-described steps.

BRIEF DESCRIPTION OF THE DRAWINGS

The disclosure is explained in more detail in the following with reference to a preferred embodiment. In the following, the drawings show.

DETAILED DESCRIPTION

Figure 1:
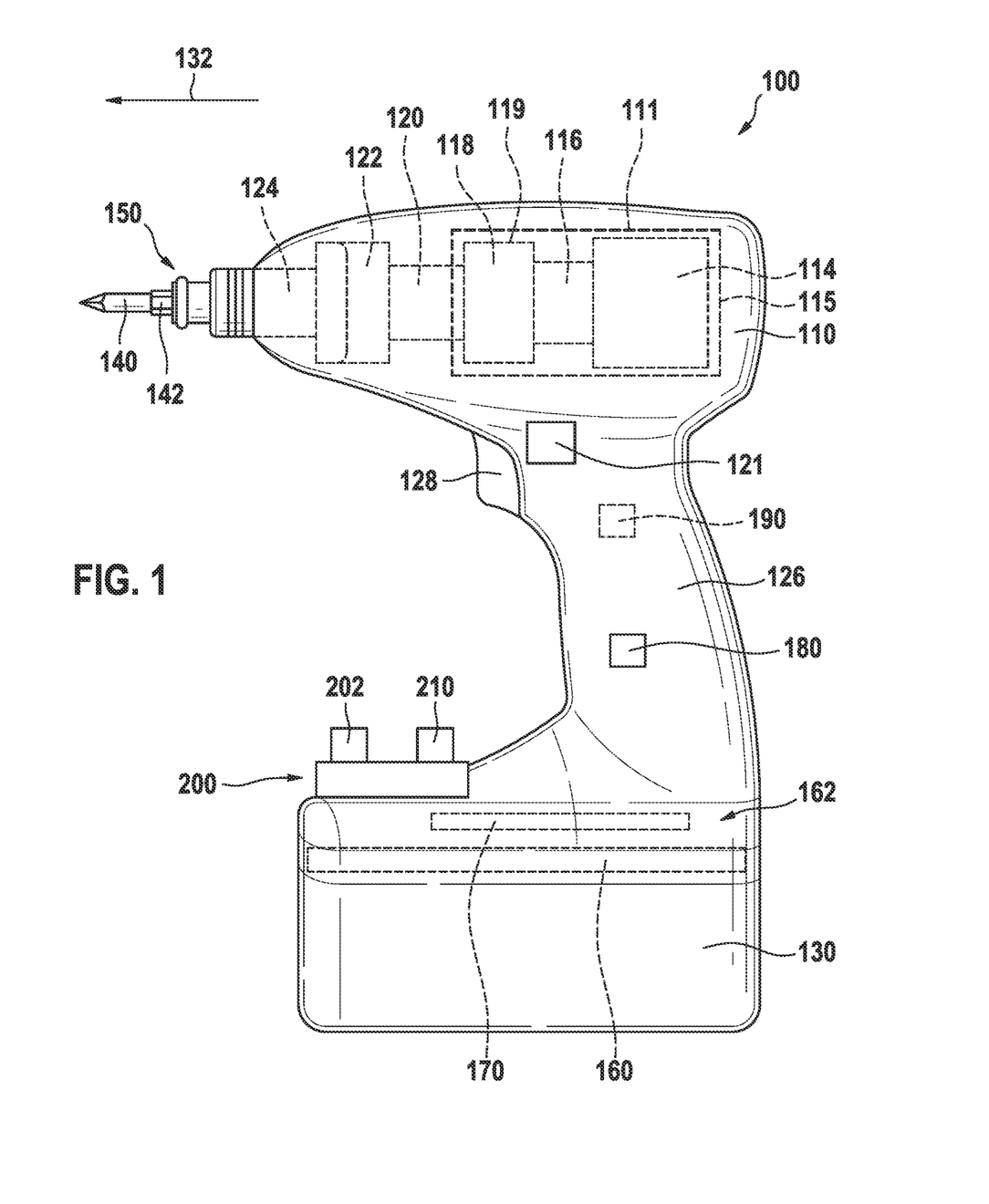
FIG. 1 a schematic view of a hand-held power tool according to the disclosure.

FIG. 1 shows a hand-held power tool 100 according to the disclosure, which is configured here for example as a cordless rotary impact screwdriver. The hand-held power tool 100 includes an output shaft 124, a tool holder 150, and, for example, a percussion mechanism 122. The hand-held power tool 100 comprises a housing 110 with a handle 126. To provide a mains-independent power supply, the hand-held power tool 100 can be mechanically and electrically connected to a power supply for cordless operation, so that the hand-held power tool 100 is configured as a cordless hand-held power tool 100. A hand-held power tool rechargeable battery pack 130 is used here as the power supply. The present disclosure is not limited to cordless hand-held power tools, however, but can also be used for mains-dependent, i.e., mains-operated, hand-held power tools or pneumatically operated hand-held power tools.

The housing 110 illustratively comprises a drive unit 111 and the percussion mechanism 122. The drive unit 111 further includes an electric drive motor 114, which is supplied with current by the hand-held power tool rechargeable battery pack 130, and a transmission 118. The transmission 118 can be configured as at least one planetary gear. The drive motor 114 is designed such that it can be actuated, for example via a manual switch 128, so that the drive motor 114 can be switched on and off. The drive motor 114 can advantageously be electronically controlled and/or regulated, so that a reversing mode and a desired rotational speed can be implemented. For the reversing mode, the hand-held power tool 100 comprises a rotation direction switching element 121 configured as a rotation direction changeover switch. The rotation direction switching element 121 is configured to switch the drive motor 114 between a clockwise direction of rotation and a counterclockwise direction of rotation.

The transmission 118 is connected to the drive motor 114 via a motor shaft 116. The transmission 118 is provided to convert a rotation of the motor shaft 116 into a rotation between the transmission 118 and the percussion mechanism 122 via a drive member 120, for example a drive shaft. A motor housing 115 is illustratively associated with the drive motor 114 as is a transmission housing 119 associated with the transmission 118. As an example, both the motor housing 115 and the transmission housing 119 are disposed inside the housing 110. However, it is also conceivable that the drive motor 114 and the transmission 118 can be disposed directly in the housing 110 if the hand-held power tool 100 is configured in an "open frame" design.

The example percussion mechanism 122 is configured to drive the output shaft 124. A tool holder 150 is provided on the output shaft 124. The tool holder 150 is preferably integrally formed with and/or configured on the output shaft 124. The tool holder 150 is preferably disposed in an axial direction 132 facing away from the drive unit 111. The tool holder 150 is configured here as a hexagon socket, in the form of a bit holder, which is provided to accommodate an insert tool 140. The insert tool is configured in the form of a screwdriver bit comprising a polygonal external coupling 142. The type of the screwdriver bit, for example HEX type, sufficiently well-known to those skilled in the art. The present disclosure is not limited to the use of HEX screwdriver bits, however; other tool holders that appear useful to those skilled in the art, such as HEX drills, SDS quick-insert tools or round-shank drill chucks, can be used as well.

The hand-held power tool 100 comprises the housing 110, a control unit 170 at least for controlling the drive unit 111, a communications unit 180, and a user interface 200. The housing 110 at least partially accommodates at least the control unit 170, the communications unit 180, and the user interface 200. The user interface 200 includes a control element 202 and a display unit 210, wherein others as further control elements are conceivable too. The control element 202 can receive inputs from a user. The control element 202 can be actuated by the user, wherein the control element 202 is configured here as a push element. The control unit 170 comprises at least one microcontroller. The control unit 170 receives switching signals that are generated using the manual switch 128. The control unit 170 furthermore processes the switching signals of the manual switch 128 before the control unit 170 forwards the switching signals to the drive unit 111. The control unit 170 also receives user interface signals from the user interface 200. The user interface signals are generated by the user's inputs via the control element 202. The control unit 170 processes the user interface signals to at least one output signal and outputs said signal. The output signal is sent to the user interface 200 and/or the drive unit 111. The user interface 200 is electrically connected to the control unit 170. As an example, the communications unit 180 is partially disposed here in the handle 126. The communications unit 180 is configured to create a communication link with an external electrical device, such as a smartphone. The communications unit 180 is also configured to transmit and/or receive communication signals. The communications unit 180 is furthermore connected to the control unit 170, so that the control unit 170 can process the communication signals.

The display unit 210 displays a status of the hand-held power tool 100 by means of a bright color, wherein the color can be substantially continuously lit or flashing. The display unit 210 can be lit in a green, red, blue, or yellow color, for example.

The housing 110 further comprises a power supply holding device 160. The user interface 200 is disposed on the power supply holding device 160. The power supply holding device 160 accommodates the hand-held power tool rechargeable battery pack 130 and forms a base 162 comprising a standing surface. The hand-held power tool rechargeable battery pack 130 can be released from the power supply holding device 160 without tools. The housing 110 also comprises the handle 126 and the power supply holding device 160. The handle 126 can be grasped by the user. In one embodiment, the power supply holding device 160 is disposed on the handle 126. The hand-held power tool 100 can be set down on the base 162. In this embodiment, the user interface 200 is disposed on the power supply holding unit 160.

The housing 110 comprises a sensor unit 190. The sensor unit 190 is disposed in or on the housing 110. The sensor unit 190 is connected to the control unit 170. The sensor unit 190 is provided to acquire a parameter 220 correlated with the drive motor 114 and forward it to the control unit 170.

Figure 2:
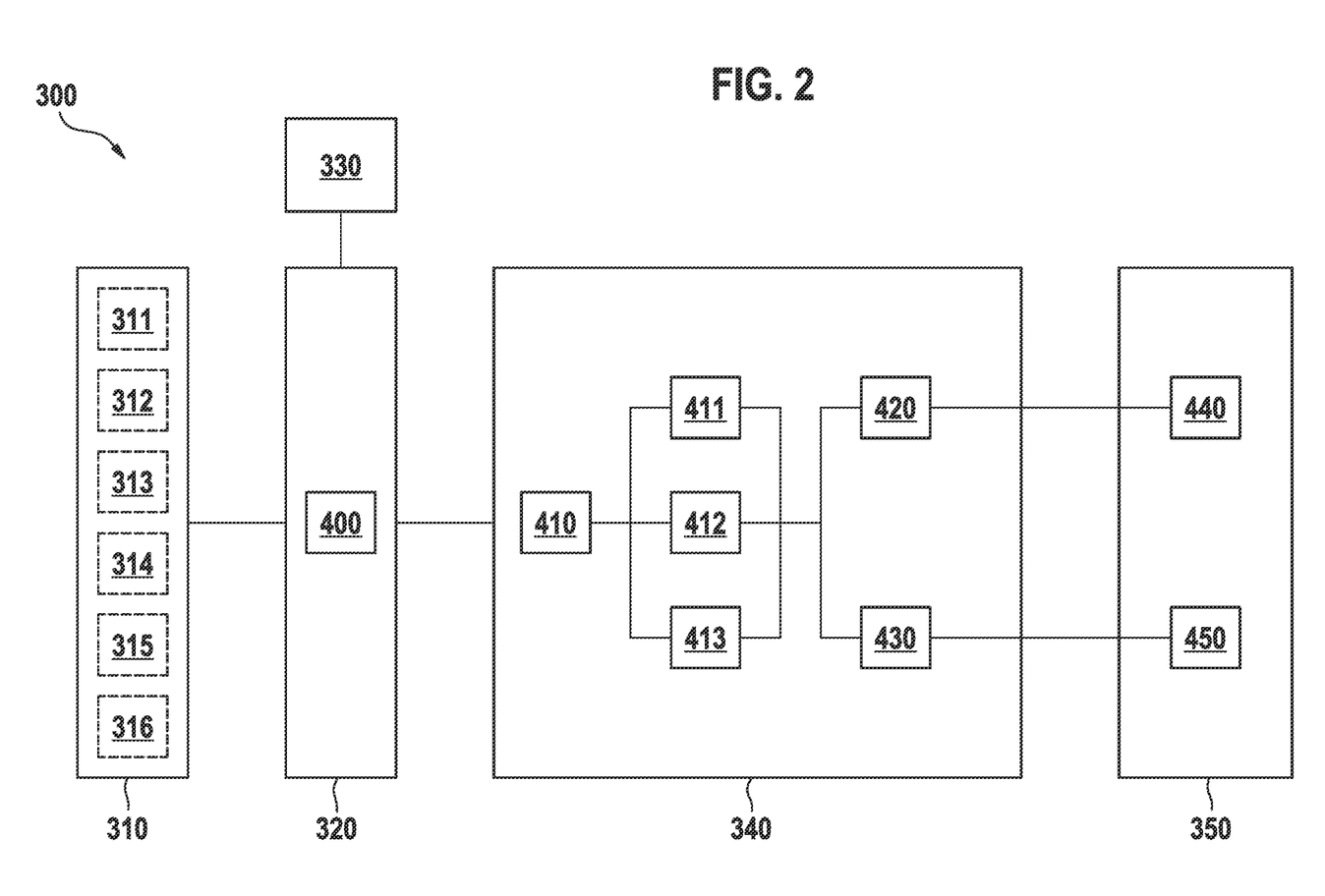
FIG. 2 a process diagram according to the disclosure.

FIG. 2 shows a method 300 according to the disclosure for indicating whether the hand-held power tool 100 has reached a target. In a method step 310, an operating mode 305 of the hand-held power tool 100, in particular the drive motor 114, is activated. The operating mode 305 can, for example, be a screwing mode 311, a drilling mode 312, a rotary impact mode 313, a wood screwing mode 314, a metal screwing mode 315, a loosening mode 316 or the like. This involves setting or selecting the operating mode 305 via the user interface 200, or activating it using an app 500.

In a method step 320, a target reached indication mode 400 is activated by the control unit 170. The method step 320 follows the method step 310. The target reached indication mode 400 checks whether the activated operating mode 305 has reached a stored target or the drive motor 114 has switched off prematurely. The target reached indication mode 400 can be activated in addition to an existing or adjustable operating mode 305, but can also be permanently set to an activatable operating mode 305. The target reached indication mode 400 is activated via the user interface 200 or using an app 500.

In an optional method step 330, the target reached indication mode 400 is activated by means of the communications unit 180. The communications unit 180 forms a communication link with at least one external electrical device.

In a method step 340 that follows the method step 320, a shutdown reason 410 of drive motor 114 is ascertained. The shutdown reason 410 is ascertained as soon as the drive motor 114 switches off or stops. To ascertain the shutdown reason 410, a position of the manual switch 128 is acquired in a method step 411. In a method step 412, the parameter 220 correlated with the drive motor 114 is optionally acquired by means of at least the sensor unit 190. The parameter 220 is used to ascertain the shutdown reason 410. In an optional method step 413, an evaluation of an event register is carried out to ascertain the shutdown reason 410. Based on the position of the manual switch 128, the parameter 220 and/or the evaluation of the event register, the control unit 170 ascertains the shutdown reason 410 as soon as the drive motor 114 stops. The shutdown reason 410 is ascertained to be an, in particular independent, reaching of a target value 420, for example. As an example, a deviation of a target value 430 of the drive motor 114 is ascertained as the shutdown reason 430.

In a method step 350, the reaching of the target is displayed by means of the display unit 210 as a function of the shutdown reason 410. The method step 350 follows the method step 340. The reaching of the target is displayed for an adjustable display duration. If the control unit 170 ascertains the reaching of the target, i.e., a match between the target value set in the set operating mode 305 and an actual value reached at shutdown, a match signal is displayed by the display unit 210 in a method step 440. The match signal is shown as an example as a green lit display unit 210. If the control unit 170 ascertains a deviation from reaching the target, a deviation signal is displayed by means of the display unit 210 in a method step 450. The deviation signal is displayed by means of the display unit 210, for example as a bright yellow or red color. The display unit 210 shows the reaching of the target, in particular the match signal or the deviation signal, by means of a continuous or interval display.

Figure 3:
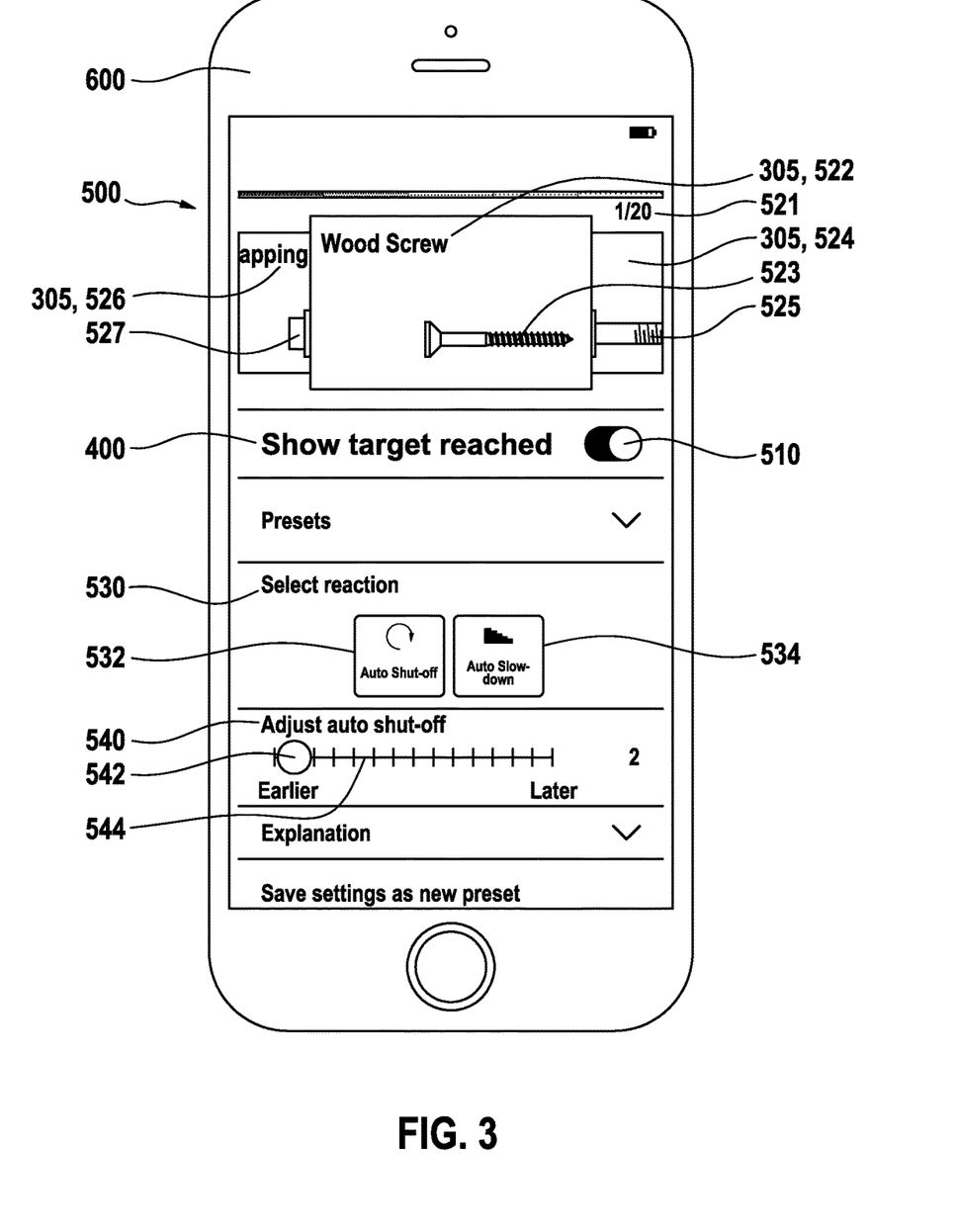
FIG. 3 an illustration of an example of an app on an external electrical device.

FIG. 3 shows an example illustration of the app 500 on an external electrical device, such as a smartphone 600. The app 500 displays a selection 521 of available operating modes 305. A wood screwing mode 522 with an example wood screw 523 is shown as an example. The app 500 also shows a further operating mode 305, namely a metal screwing mode 524 with an example metal screw 525. The app 500 furthermore shows the operating mode 305 for a self-tapping mode 526 with an example self-tapping screw 527.

The app 500 also shows a selection box for the target reached indication mode 400. This can be activated via an activation switch 510, so that the target reached indication mode 400 can be activated in addition to the selected operating mode 305. A response 530 for reaching the target can be set for the operating mode 305 via the app 500. An autostop function 532 or an auto slow down function 534 can thus be set. With the autostop function 532, a setting 540 for a time to carry out the autostop function 532 can be set using an adjusting element 542 on an adjusting bar 544, for example.

What is claimed is:

1. A method for indicating whether a hand-held power tool has reached a target, wherein the hand-held power tool includes a drive motor, the method comprising:
    activating a target reached indication mode by way of a control unit;
    ascertaining a shutdown reason for the drive motor when the drive motor switches off or stops; and
    displaying the reaching of the target by way of a display unit as a function of the shutdown reason.

2. The method according to claim 1, further comprising activating an operating mode of the hand-held power tool.

3. The method according to claim 1, wherein reaching a target value is ascertained as the shutdown reason.

4. The method according to claim 1, wherein a deviation of a target value is ascertained as the shutdown reason.

5. The method according to claim 1, further comprising acquiring a position of a manual switch for controlling the drive motor.

6. The method according to claim 1, further comprising acquiring a parameter correlated with the drive motor by way of at least one sensor unit to ascertain the shutdown reason.

7. The method according to claim 1, further comprising carrying out evaluation of an event register to ascertain the shutdown reason.

8. The method according to claim 1, further comprising displaying reaching the target during an adjustable display duration.

9. The method according to claim 1, further comprising displaying a deviation signal by way of the display unit when a deviation from reaching the target is ascertained.

10. A hand-held power tool comprising a control unit configured to carrying out the method according to claim 1.

\* \* \* \* \*